F. A. SCHULZ.
TILTING VISE.
APPLICATION FILED AUG. 17, 1911.
1,042,611.
Patented Oct. 29, 1912.
2 SHEETS—SHEET 1.
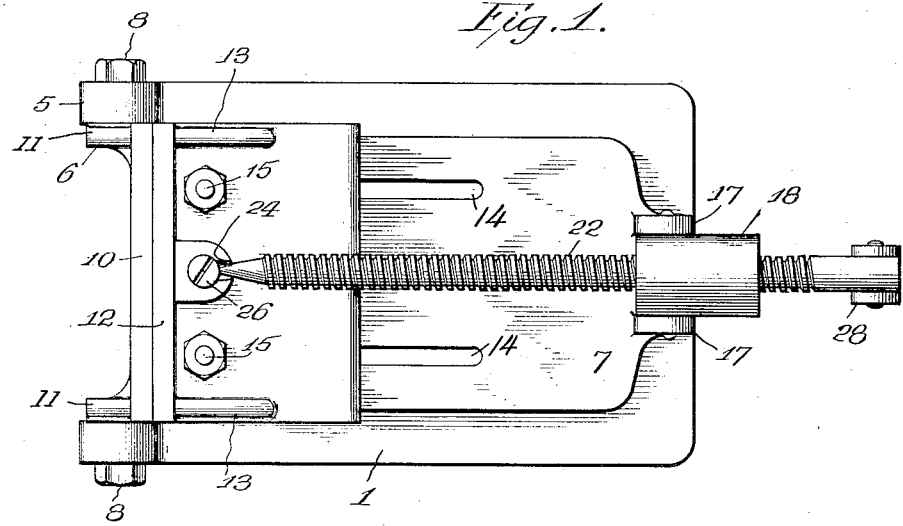
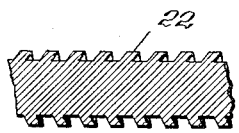
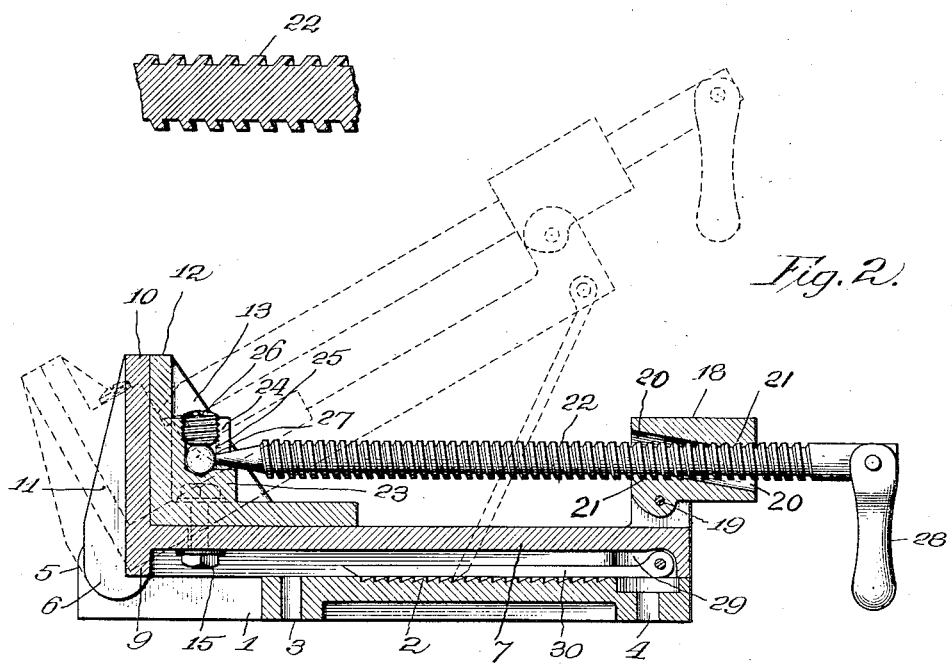
Witnesses:
Robert H. Weir
A. H. Rabag
Inventor:
Fritz A. Schulz
by Rudolph M. Fogg Atty F. A. SCHULZ.
TILTING VISE.
APPLICATION FILED AUG. 17, 1911.
1,042,611.
Patented Oct. 29, 1912.
2 SHEETS—SHEET 2.
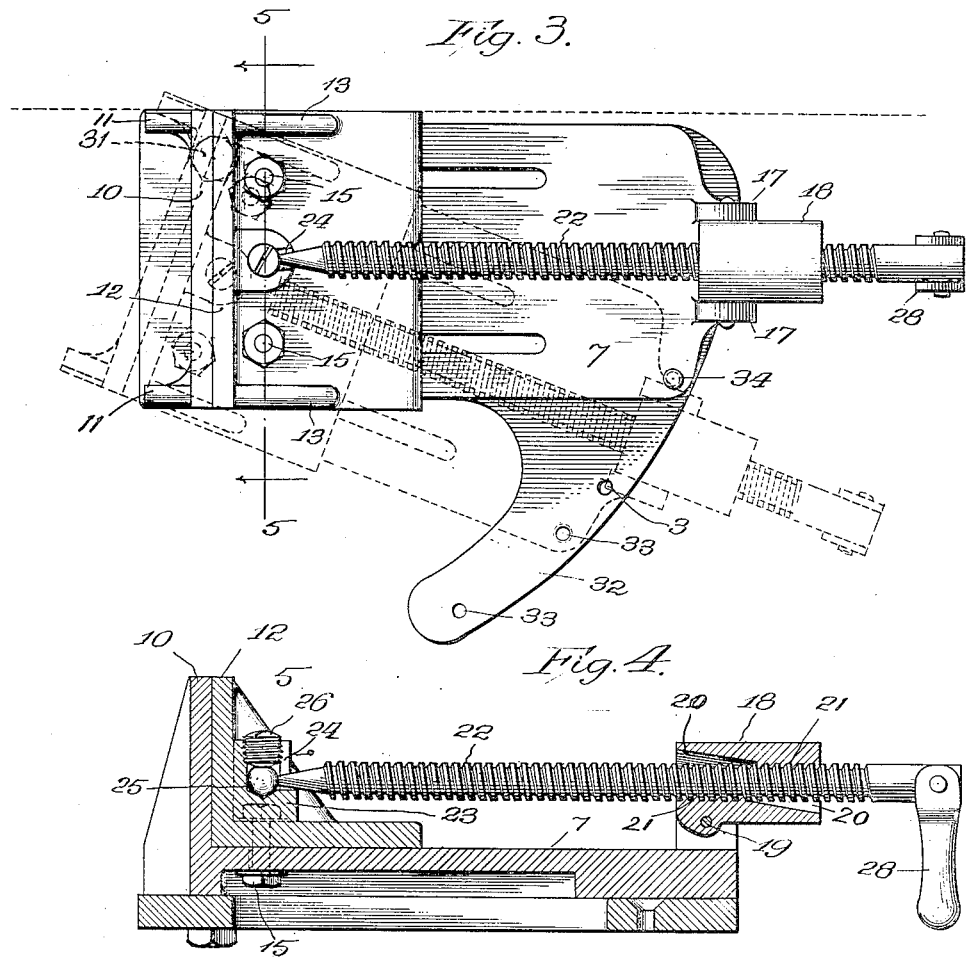

UNITED STATES PATENT OFFICE.

FRITZ A. SCHULZ, OF CHICAGO, ILLINOIS.

TILTING VISE.

1,042,611. Specification of Letters Patent. Patented Oct. 29, 1912.

Application filed August 17, 1911. Serial No. 644,584.

*To all whom it may concern:*

Be it known that I, FRITZ A. SCHULZ, citizen of the United States, residing at Chicago, in the county of Cook and State of Illinois, have invented certain new and useful Improvements in Tilting Vises; and I do hereby declare the following to be a full, clear, and exact description of the invention, such as will enable others skilled in the art to which it appertains to make and use the same.

This invention has for its object to provide vises adapted to be mounted upon machine tool bed plates or tables for the purpose of holding the work to be operated upon.

The invention consists in the features of construction and combinations of parts hereinafter fully described and claimed.

In the accompanying drawings: Figure —1— is a top plan view of a vise adapted for use on drill press tables, shapers and milling machines, constructed in accordance with my invention. Fig. —2— is a central vertical longitudinal section of the same. Fig. —3— is a plan view of the vise adapted for use on hack-saw tables. Fig. —4— is a central vertical longitudinal section of the same. Fig. —5— is a transverse section of the same on the line 5—5 of Fig. —3—. Fig. —6— is a longitudinal section of the screw-shaft employed.

In the operation of drill presses it is frequently necessary to drill holes through pieces of such irregular shapes as to render it difficult to mount them upon the table in proper position relatively to the drill for boring a hole at the point and angle desired. To mount the object frequently requires the expenditure of a great deal of time and in the event of slippage during the drilling causes the breakage of drills and a repetition of the labor involved in again properly mounting the object to be drilled upon the table. This is true also with relation to mounting objects upon shapers and milling machines in proper position relatively to the cutting or milling tools. It is also frequently desired in sawing shafts, tubes, structural iron and the like, in a hack-saw to cut the same angularly with great accuracy.

My invention has for its object to provide a vise in which the work to be drilled, planed, milled or sawed may be engaged and which may be mounted upon the table of the machine such as a drill press, shaper, milling machine, or saw to enable the bore of cut to be made accurately at the requisite angle and point desired.

The construction of the device to adapt it for drill presses, shaper and milling machines, is slightly different from that adapting it for hack-saw tables, that is to say, in drill press work, shaping or milling, the work must be adjusted relatively to a horizontal plane while in a hack-saw it must be adjusted relatively to a vertical plane.

The device, as shown in Figs. —1— and —2—, consists of a bed plate 1 of substantially rectangular form which is adapted to be secured by means of clamps, or in any other suitable manner to the table of a drill press or other machine tool. The said plate 1 is provided midway between its side edges and longitudinally thereof with a rack 2 consisting of a series of ratchet teeth. Said plate is further provided with openings 3 and 4 through which bolts for securing the same to the table of the machine may pass, if desired. At one end said plate 1 is provided with flanges 5 to which the end flanges or projections 6 of a plate 7 are adapted to be pivotally secured by means of bolts 8 in a well-known manner. The said plate is preferably provided with a downwardly extending peripheral flange 9 so that the body portion thereof may be supported normally at an elevation above the plate 1 thereby forming a hollow underneath the plate 7 in which the heads of bolts and other devices may be received. Said plate is further provided at one end with a vertical flange 10 constituting the fixed jaw of a vise, the latter being reinforced by the ribs 11 constituting continuations of the flanges 6. Slidably mounted on said plate 7 is a movable vise jaw 12 which is L-shaped in vertical section and is provided with reinforcing ribs 13 at either side. The said plate 7 is provided with parallel longitudinal slots 14 through which the shanks of the bolts 15 are adapted to pass, said bolts being mounted in openings in the horizontal flange of the jaw 12 and coacting with said slots 14 to guide said jaw 12 in its movements toward and from the jaw 10. The said horizontal flange of said jaw 12 is further provided on its side edges with downwardly extending flanges 16, more particularly shown in Fig. —5—, which engage the outer side edges of the plate 7 and coact with the latter to guide said jaw 12 in its reciprocal movements. The said plate 7 is provided at its other end with two upwardly projecting ears 17 between which a sleeve 18 is pivotally mounted by means of a pin 19 in a well-known manner. The said sleeve is provided with a central opening laterally enlarged at opposite sides and ends, as at 20, each of said enlarged portions being opposed by threaded portions 21 which are adapted to engage the screw shaft 22 by means of which the said jaw 12 is adapted to be reciprocated. The jaw 12 is provided midway between its side edges with a projection 23 which is provided in the end thereof opposing the sleeve 18 with a vertical slot 24 and is further provided with a vertical opening 25 communicating with said slot 24 and in which a screw plug 26 is adapted to be received. The said screw shaft 22 is provided at one end with a spherical projection or head 27 which is adapted to engage in said opening 25 and is adapted to be held against removal therefrom by said screw plug 26. At its other end said screw shaft is provided with a pivoted crank arm 28 by means of which it is adapted to be rotated. Mounted between parallel flanges 29 on the lower face of the plate 7 inwardly of the peripheral flange 9 and in vertical alinement with the sleeve 18 is an arm 30 provided with a sharp free end which is adapted to engage the ratchet teeth 2 on the plate 1 for the purpose of supporting the plate 7 at any desired angle relatively to the plate 1, as indicated in dotted lines in Fig. —2—.

The operation of the device is as follows: The sleeve 18 is pivotally secured at one end between said ears 17 and the weight of the screw shaft 22 serves to maintain the same normally at the lower limit of its movements in which position the threads 21 engage the threads of the screw shaft 22. When so engaged, the screw shaft may be turned to impart movement to the jaw 12 relatively to the jaw 10. In order to disengage the threads 21 from the threads of the shaft 22 the outer end portion of the said shaft is slightly raised whereby said sleeve is turned on its pivot into a position in which the threads 21 thereof are disengaged from the threads of said shaft and while maintaining the shaft so raised the same may be freely moved longitudinally relatively to said sleeve thus enabling the jaw 12 to be very quickly adjusted relatively to the jaw 10 to receive the work between the same. By then permitting the shaft 22 to drop the sleeve is again turned into a position in which the threads 21 engage the threads of said shaft and by then rotating said shaft a final movement may be imparted to the jaw 12 to firmly engage the work between the same and said jaw 10. The device is thus rendered very quick acting as will be obvious.

In order that the device may be successfully operated the bearing faces of the threads of the shaft 22 and the similar faces of the threads 21 of the sleeve must be perpendicular to the axis of said shaft 22 or preferably said bearing faces are slightly undercut so that the pressure exerted by the respective threads upon each other will tend to hold the threads of the sleeve firmly in engagement with the threads of the shaft and vice versa thereby preventing the possibility of disengagement of said parts and consequent release of the work during operation upon the same.

The said arm 30 and ratchet teeth 2 enable the plate 7 to be disposed at a maximum angle of 45 degrees to the plate 1, this being ample latitude of adjustment for a hole to be drilled at any desired angle in a given piece of work, or a face thereof to be planed or milled at an angle to another face of the object, as will be apparent.

In the construction shown in Figs. —3—, —4— and —5— the plate 1 is devoid of the ratchet teeth 2 and the plate 7 is pivotally secured to said plate 1 by means of a bolt 31, the latter being preferably disposed in the plane of the inner face of the fixed jaw 10, the said plate 7 being adapted to be swung in a horizontal plane on the axis of said bolt 31 as a pivot thus enabling the device engaged between the jaws 10 and 12 to be adjusted so as to cause the saw cut to be made at any desired angle relatively to the longitudinal axis of the work. In order that the plate 7 may be firmly held in any position to which it is adjusted, as indicated in dotted lines in Fig. —3—, the plate 1 is provided with a segmental arm 32 at one side which is provided at intervals with openings 33 adapted to receive a pin 34 which projects through an opening in one corner of the plate 7. Said openings 33 are arranged at such intervals as to enable the work to be disposed at various angles from zero to forty-five relatively to the plane of the saw.

The device is very simple and efficient and besides enabling work to be accurately done is the means of economizing a great deal of the operator's time.

I claim as my invention:

1. A vise of the kind specified comprising two members pivotally connected with each other and adjustable relatively to each other to dispose the same at various relative angles, a flange on one of said members constituting the fixed jaw of the vise, a member movable in guides relatively to said flange and constituting the movable jaw of the vise, a sleeve pivotally mounted upon the said flanged member and provided with a longitudinal opening equipped with threads at opposite sides and ends thereof, said opening enlarged at its ends opposite each of said threaded portions, and a screw-shaft passing through said sleeve and engaged at one end with said movable jaw, said shaft adapted to engage the threads of said sleeve when the latter is turned to one limit of its pivotal movement and being freely longitudinally movable therein when the said sleeve is turned to the other limit of its pivotal movement.

2. A vise comprising a member equipped with an integral flange constituting a fixed jaw, a traveling jaw, guiding means for governing the movements of said traveling jaw relatively to said fixed jaw, a sleeve pivotally secured at one of its ends to the end portion of said member opposite to the fixed jaw, there being a central opening in said sleeve, threads at opposite sides and ends of said sleeve within said opening, the latter laterally enlarged opposite said threaded portions, and a screw-shaft passing through said sleeve and having pivotal connection with said traveling jaw at one end, said sleeve adapted to be turned on its pivot by lateral movement of the screw shaft in a plane perpendicular to the axis of said pivot to throw the threads of said sleeve into and out of engagement with the threads of said shaft.

3. A vise comprising a member equipped with an integral flange constituting a fixed jaw, a traveling jaw, guiding means for governing the movements of said traveling jaw relatively to said fixed jaw, a sleeve pivotally secured at one of its ends to the end portion of said member opposite to the fixed jaw, there being a central opening in said sleeve, threads at opposite sides and ends of said sleeve within said opening, the latter laterally enlarged opposite said threaded portions, a screw-shaft passing through said sleeve, a spherical head on one end of said shaft, there being a pocket in said traveling jaw adapted to receive said head and provided with a longitudinal slot for the passage of the shank of said head, a screw-plug adapted to engage in the open end portion of said pocket to retain said spherical head therein, said sleeve adapted to be turned on its pivot by lateral movement of the screw shaft in a plane perpendicular to the axis of said pivot to throw the threads of said sleeve into and out of engagement with the threads of said shaft.

In testimony whereof I have signed my name in presence of two subscribing witnesses.

FRITZ A. SCHULZ.

Witnesses:
RUDOLPH WM. LOTZ,
J. M. WELLER.